Patented Oct. 20, 1925.

1,558,442

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

FURFURAL PRODUCT AND PROCESS OF MAKING SAME.

No Drawing.     Application filed September 2, 1924. Serial No. 735,518.

*To all whom it may concern:*

Be it known that I, CARLETON ELLIS, a citizen of the United States, and a resident of Montclair, in the county of Essex and State of New Jersey, have invented certain new and useful Improvements in Furfural Products and Processes of Making Same, of which the following is a specification.

This invention relates to films or plastic material, molded articles, castings and the like made by solidifying a solution of a celluose ester such as nitrocelluolose or acetyl cellulose dissolved in furfural.

Furfural is an effective solvent for nitrocellulose and dissolves acetyl cellulose well although somewhat less readily. When such solutions or jellies are rendered acid the furfural sets to a resinous product in which the cellulose ester appears to be dissolved as a sort of solid solution. The furfural resin by itself does not have satisfactory physical properties for many purposes but the presence of nitrocellulose toughens it and yields a plastic material which may be used in some cases as a substitute for celluloid.

The furfural which I employ may be the commercial type containing a few per cent of water or it may be dried and redistilled. Derivatives of furfural such as methyl furfural and the like also may be employed in some cases.

Nitrocellulose may be employed in the form of gun cotton, soluble cotton, celluloid cotton, celluloid film including celluloid scrap, cleaned moving picture film, soluble cotton of reduced viscosity etc. Acetyl cellulose in various forms such as the acetone-soluble variety may be employed.

The setting or resinification of the furfural may be brought about by mineral acids such as hydrochloric or sulphuric acids. Phosphoric acid yields lighter colered masses which in some cases are quite uninflammable. Organic acids such as formic, acetic, benzoic, phthalic and the like are less active in setting than the mineral acids but on the other hand they are more desirable in many cases. This is especially true when products are required which are to be used in contact with metals and the presence of strong mineral acid might cause corrosion.

As an example a 10 per cent solution of soluble cotton in furfural is treated with from 1 to 10 per cent of concentrated hydrochloric acid or a small amount of hydrochloric acid gas is passed into the solution. The acidulated material may be poured into molds or exposed in the form of films and allowed to set and harden. At the end of a day or two a black, tough, glossy, flexible film or a tough strong cast article is obtained.

With organic acids the reaction progresses more slowly and mild heat may be applied if desired to hasten the reaction.

Compositions made in this way using 10 per cent of strong hydrochloric acid are inflammable while those made with 10 per cent of metaphosphoric acid cannot be ignited. If a film of such material is placed in a Bunsen flame it chars at the point where the flame impinges but combustion does not spread. The proportion of nitrocellulose of course may be varied to the extent desired and in some cases volatile solvents may be present. Also it is possible to add the usual fillers employed in the field of plastics. It should be borne in mind however that basic fillers such as chalk may neutralize acidity and check the setting properties of the composition.

I propose to employ mixtures of this character to make articles such as brush handles and other fairly massive articles which heretofore have been generally made from celluloid under conditions requiring a great deal of manipulation. With the present composition I propose to make such articles simply by casting in suitable molds.

Another field of application is that of coating cloth or other fabric or impregnating suitable tissue with such mixtures to obtain artificial leather. After the reaction has been completed any free or superficial acid may be reduced in amount or eliminated by washing in water or dilute alkaline solutions. Impregnated cloth or paper may be pressed together in some cases to make composite sheets and special articles.

What I claim is:—

1. The process which comprises resinifying furfural in the presence of a dissolved cellulose ester.

2. The process which comprises resinifying furfural in the presence of dissolved nitrocellulose.

3. The process of making cast articles which comprises dissolving nitrocellulose in furfural and allowing the mixture in an acidulated condition to harden in suitable molds whereby castings are obtained.

4. A casting comprising resinified furfural and nitrocellulose in solid solution therein.

5. A casting comprising resinified furfural and a cellulose ester in solid solution therein.

6. A product comprising furfural and nitrocellulose hardened by an acid.

CARLETON ELLIS.